United States Patent [19]

Clark

[11] 4,115,002
[45] Sep. 19, 1978

[54] METHOD AND APPARATUS FOR PHOTOGRAPHIC RECORDATION OF MULTIPLE IMAGES

[76] Inventor: Thomas D. Clark, 4232 River Rd., Toledo, Ohio 43614

[21] Appl. No.: 792,687

[22] Filed: May 2, 1977

[51] Int. Cl.² .................. G03B 27/44; G03B 27/62; G03B 27/32
[52] U.S. Cl. ........................... 355/54; 355/46; 355/75; 355/77
[58] Field of Search ............ 355/18, 46, 54, 73, 355/75, 77

[56] References Cited

U.S. PATENT DOCUMENTS

| | | | |
|---|---|---|---|
| 1,793,698 | 2/1931 | Jones | 355/46 |
| 2,498,278 | 2/1950 | Kaplowitz | 355/75 X |
| 2,519,610 | 8/1950 | Sussin | 355/73 |
| 3,286,586 | 11/1966 | Whitney | 355/54 X |
| 3,604,328 | 9/1971 | Nakagawa | 355/75 |
| 3,858,974 | 1/1975 | Liguori | 355/54 X |
| 3,973,344 | 8/1976 | Frankel | 355/75 X |

FOREIGN PATENT DOCUMENTS

| | | | |
|---|---|---|---|
| 707,291 | 6/1941 | Fed. Rep. of Germany | 355/18 |
| 548,342 | 9/1956 | Italy | 355/46 |

Primary Examiner—Donald A. Griffin
Attorney, Agent, or Firm—Richard D. Emch

[57] ABSTRACT

A method and apparatus for photographic recordation of multiple images having high information density is disclosed. A plurality of camera original photographs, of a first size and arrangement as a first group are mounted into receptacles in a copy frame and uniformly illuminated. The illuminated copy frame is located before a copy camera having independent lenses, for projecting independent, total images onto the image or film plane of the copy camera. A target area is located on the image or film plane. Each lens is adjusted to project a portion of its total image on the target area. The cumulative image on the target area comprises a selected portion of each independent total image, and each selected portion consists of an image of a different portion of the copy frame displaying independent images of the camera originals in a second size and arrangement as a second group distinct from the first group.

13 Claims, 10 Drawing Figures

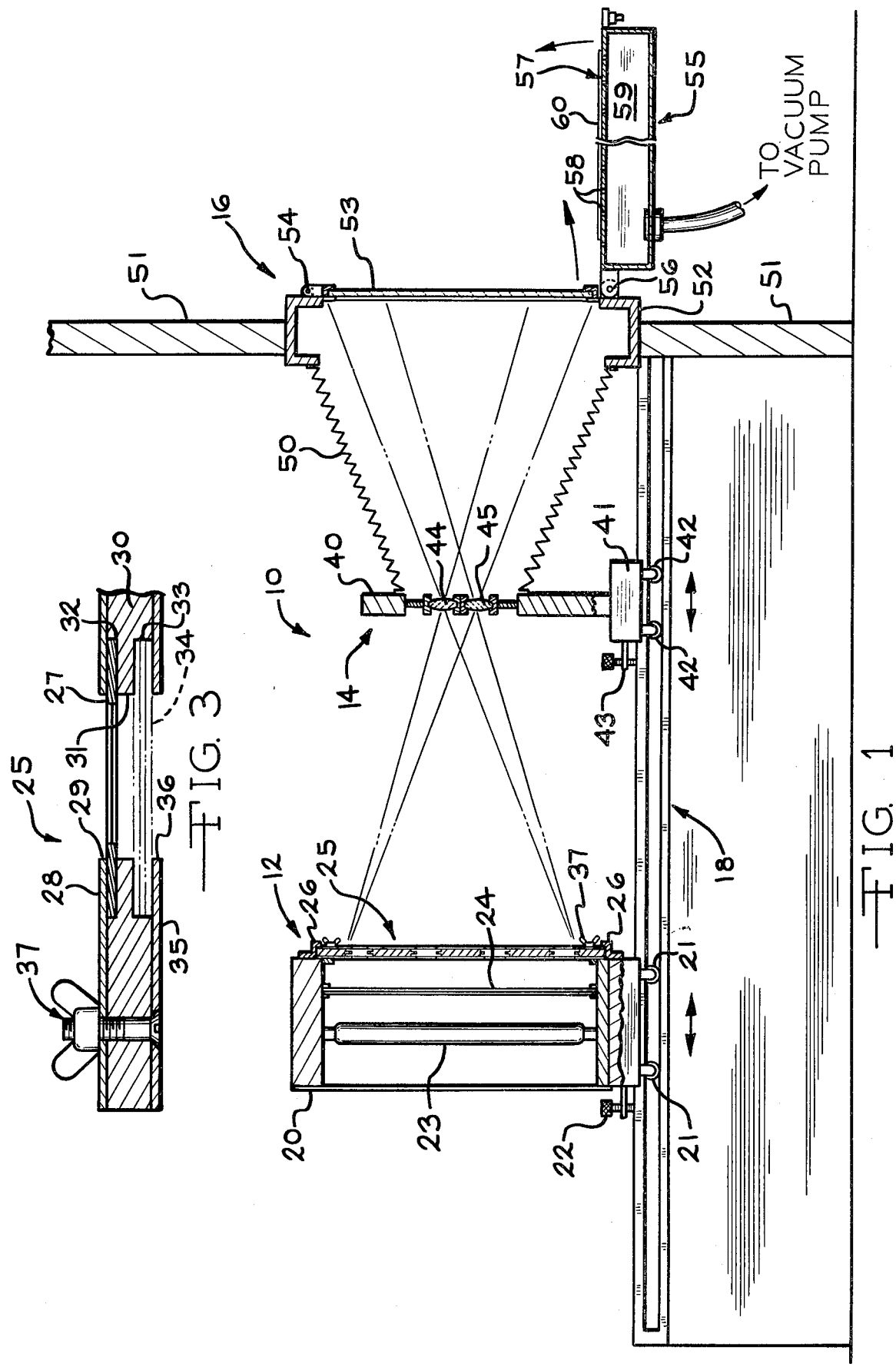

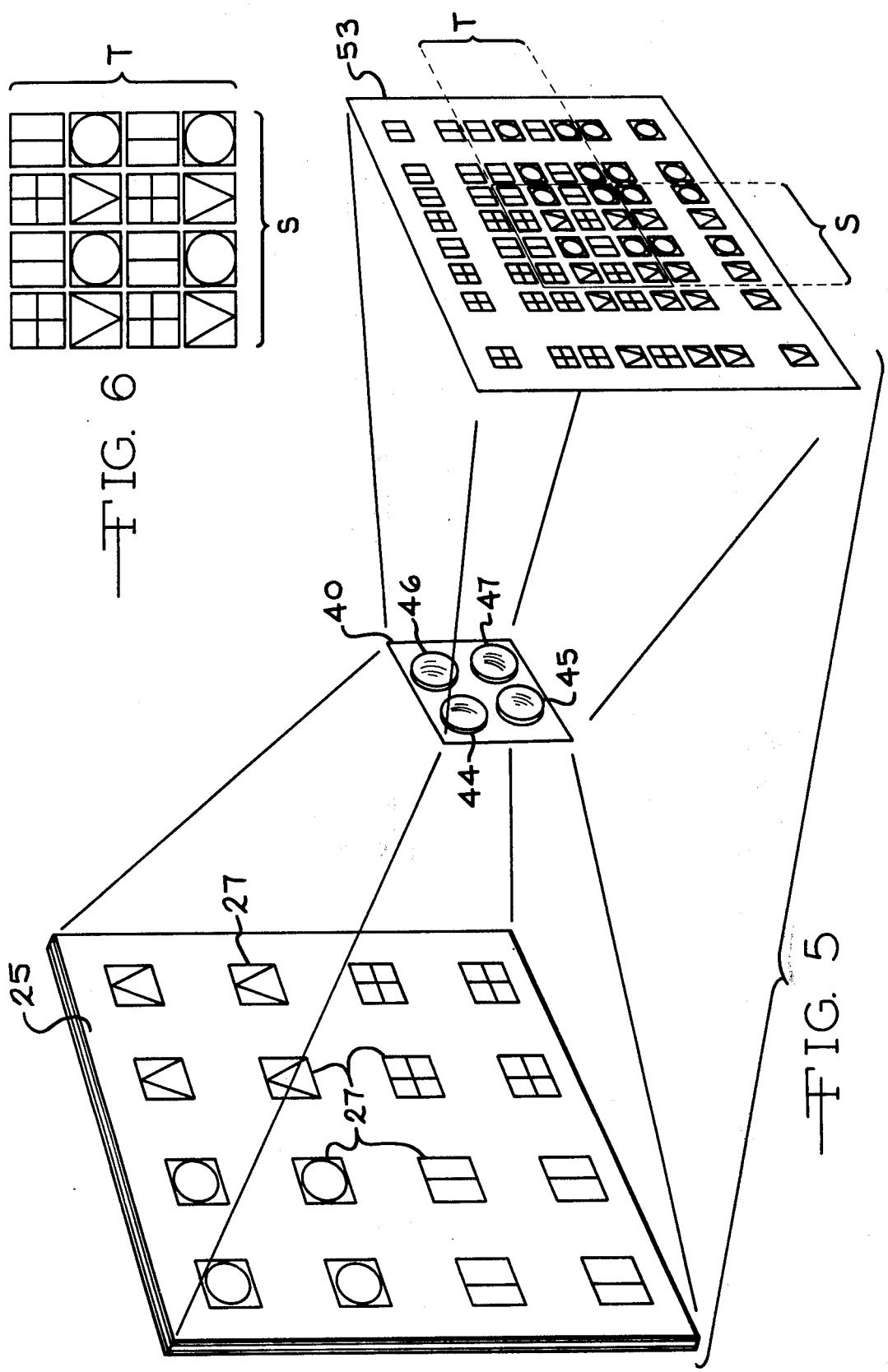

METHOD AND APPARATUS FOR PHOTOGRAPHIC RECORDATION OF MULTIPLE IMAGES

BACKGROUND OF THE INVENTION

The present invention relates to a photographic system including a method and apparatus for producing high density photographic records or fiche of slides and other material which may be copied by photographic techniques.

The duplication of slides and other photographic material is an increasingly necessary, important and time consuming project. Color photograph techniques employing sophisticated color reversal film, has been commercially feasible only since the end of World War II. It has therefore only recently become known that the archival life of these color materials is extremely limited; color transparencies retained in light-tight closed files fade and disappear without about 25 years if kept at room temperature. For this reason valuable color transparency libraries now face extinction unless they are preserved at extremely low temperatures (0° Farenheit or below).

Cold storage of the originals is not feasible unless a high quality color reproduction of reasonable cost can be manufactured. One object of the present invention is therefore to provide a method and apparatus for making high quality reproduction of multiples of camera original photographs which, whether they are continuous tone black and white or color, are of sufficient quality to be themselves reproduced. At the same time these reproductions are rationalized and integrated in multiples on a single copy sheet.

A second problem in the photography industry is the sheer volume of photographs and photographically recorded material that must be preserved, yet kept conveniently available. Microfilm and microfiche have been used in the past to solve storage problems in specialized areas; namely textual material and date recordation, but high quality reduction and recordation techniques for photographs and slides have heretofore not been commercially possible.

Furthermore, duplication of 35 millimeter slides, the most common form of camera original color transparencies in existance throughout the world, poses an especially perplexing problem. Because the image or film is carried in an opaque mounting frame which is several times larger than the image, the ratio of the film image area to opaque mounting frame area is low. The slide thus has a low information ratio or information density. The straight-forward duplication of slides placed adjacent one another produces a copy having an equally low information ratio, because although the actual size may be reduced, the ratio of image frame to mounting frame remains constant. Additionally, any jig or frame utilized to facilitate the handling and positioning of the slides in the duplication apparatus, increases the blank area between the slide and further lowers the information density of the produced copy.

The present invention provides a method and apparatus for reproducing a group of camera-original transparencies of any size into a second integrated group of images. The integrated reproduced images may be of any selected size; limited only by the reproduction quality desired relative to the original quality and size of the transparency.

SUMMARY OF THE INVENTION

The invention is a method and apparatus for recordation of multiple images onto a film plane. The method comprises the steps of (1) placing camera original processed materials in a jig, having pre-determined open spacings for locating the camera originals, (2) placing the jig before a light source and the lens board of a copy camera, (3) placing separate lenses of a selected focal length at pre-determined locations on the lens board (each lens "sees" and projects an image of the jig onto the film plane of the copy camera and the projected images overlap in a selected target area of a selected size on the film plane of the copy camera), (4) selecting a photo-sensitized material having the same dimension as the target area, (5) placing the photo-sensitized material in the target area on the film plane; and (6) exposing the photo-sensitized material to produce spaced and integrated images of the camera originals; each integrated image being of a projected size on the photo-sensitized material.

The apparatus for carrying out the above method comprises a jig or frame for retaining camera original materials in a pre-determined, spaced relationship in a single plane. The camera original materials are located in spaced openings in the jig for illumination by a selected light source. The frame is positioned on a copy stand before a copy camera.

The copy camera comprises a film plane for receiving photo-sensitized copy material and a lens board supported by any conventional apparatus before the film plane. At least two lenses of a selected focal length (in the preferred embodiment four lenses are used) one positioned on the lens board at a pre-determined location; determined by the relationship between the selected focal length of the lenses, the size of the camera original materials to be copied, the selected size of the photo-sensitized copy material, and the desired individual copy image size.

The lenses, thus positioned, separately project a total image of the illuminated jig onto the film plane. The separate total images are selectively overlapped for integrating individual images of the camera originals in a target area on the film plane. The overlapping areas of the total image in the target area present every individual image of the camera originals onto the target area in a selected spaced relationship and to selected size.

The resultant copy has a high information ratio: a copy having a ratio of utilized space to total space available on the sensitized material approaching unity. The copy images can be of any ratio of reduction or magnification relative to the camera originals.

The slide holding frame or jig includes receptacles for color and density correction filters for selectively altering color balance and density of the camera originals.

BRIEF DESCRIPTION OF THE DRAWINGS

FIG. 1 is a side elevational sectional view illustrating a multiple image integrating camera of the present invention.

FIG. 3 is a sectional view of the slide-holding frame illustrating the slide and filter retaining recesses and alignment of the slide frame apertures;

FIG. 5 is a spatial perspective view schematically illustrating the arrangement of the slide-holding frame, lenses and generated image;

FIG. 6 is an enlarged elevational view of the integrated central image generated by the four lenses;

DESCRIPTION OF THE PREFERRED EMBODIMENT

Figure 4:
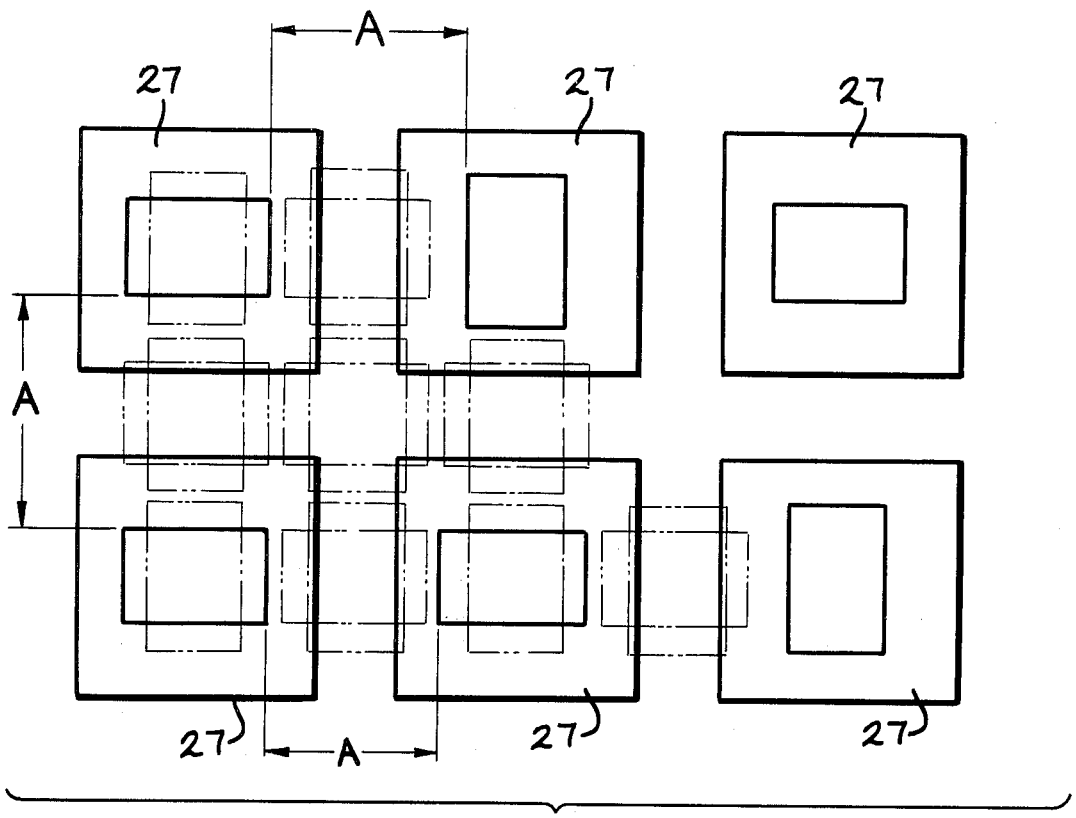
FIG. 4 is a plan view of the slide-holding frame illustrating inter-image spacing.

Referring now to the drawings and, more particularly, to FIG. 1, an image integrating assembly designated by the reference numeral 10, is illustrated. The assembly 10 comprises a generally vertically disposed and horizontally translatable image and light source 12, a generally vertically disposed and horizontally translatable lens assembly 14, and a generally vertically disposed camera bellows and back assembly 16 connected to the lens assembly 14. The light source and image assembly 12 and lens assembly 14 rest upon and are horizontally translatable along a horizontal track assembly 18.

It should be noted that although the following description is directed to the duplication of transparent images such as slides, opaque images which require front lighting and which may or may not be of uniform size are capable of duplication by the techniques herein described.

The light and image assembly 12 comprises a five-sided box-like housing 20 having its sixth, open side oriented toward the lens assembly 14. The housing 20 is mounted upon rollers 21 which facilitate the horizontal translation of the housing 20 along the track 18. A locking device 22 such as a threaded set screw is utilized to inhibit horizontal translation of the housing 20 relative to the track 18 after the housing 20 has been optimumly positioned. Alternatively, the locking device 22 may take the form of a gear pinion which mates with a horizontal toothed gear rack affixed to horizontal track 18.

The housing 20 further includes a source of diffused light 23 such as an electric light, having the proper color characteristics, i.e., color temperature, to facilitate the accurate duplication of color in slides or other material. The housing 20 also preferably includes one or more panes of frosted glass 24 which are used to further diffuse the light from the light source 23 and ensure a uniform intensity of light across the open face of the housing 20. The open side of the housing 20 is covered by a jig or frame 25 which contains the camera original materials which are to be copied. The frame 25 is oriented vertically and is attached to the housing 20 by retaining clips 26 or other suitable mounting means.

Figure 2:
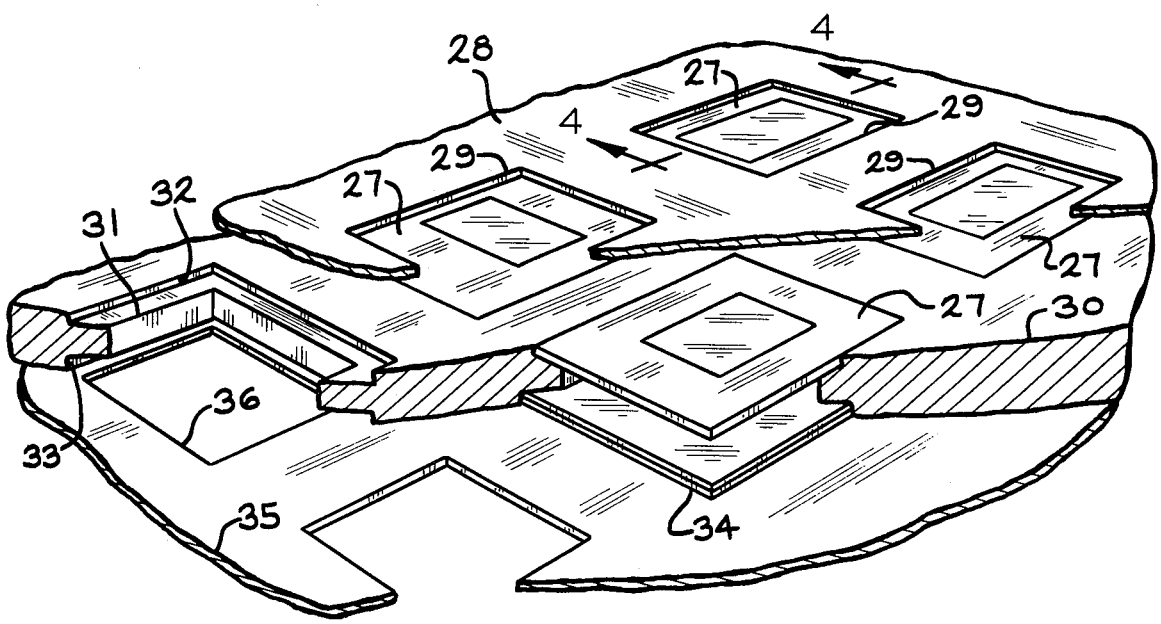
FIG. 2 is a cutaway perspective view of the slide-holding frame.

The jig of the present embodiment is adapted to accomodate mounted 35 millimeters or 2 inches × 2 inches slides. It is to be understood that the jig can also accommodate non-mounted negative or positive transparency materials as well as opaque prints. Referring now to FIGS. 2, 3, and 5 the jig or frame 25 contains a plurality of slides 27. The frame 25 is a sandwich comprising three plates which may be fabricated of metal or other suitable material and which have a plurality of apertures formed in them. Referring now particularly to FIGS. 2 and 3 the outer plate 28 contains a plurality of square apertures 29 which form a uniform grid across the face of the outer plate 28. The frame 25 further includes a center plate 30 having apertures 31 equal in size and number to those in plate 28 and having centers corresponding to the centers of apertures 29 in outer plate 28. Surrounding apertures 31 of center plate 30 are recesses 32 sized to accommodate conventional slides 27. The depth of recesses 32 is equal to the thickness of the slides 27 and outer plate 28 cooperates to tightly retain the slides 27 in center plate 30. On the opposite side of center plate 30, surrounding each aperture 31, is a second plurality of recesses 33. The recesses 33 accomplish the retention and positioning of color correction and neutral density filters 34 which may be employed in the duplication process to correct color and density in individual slides 27. Since there is no standard filter size, the recesses 33 may be of such dimensions as the user desires. It is convenient from a fabrication standpoint, however, to utilize the identical dimensions in recesses 33 as in recesses 31. The recesses 33 are of sufficient depth to accommodate several color and density filters 34 so that color and density correction may be accomplished simultaneously. The slide frame 25 is completed by a third, inner plate 35. Inner plate 35 includes a plurality of apertures 36 of identical size and position to those apertures 29 in outer plate 28. The entire slide frame 25, comprising outer plate 28, center plate 30 and inner plate 35, is held together by several clamp assemblies 37 which may take the form of a captive bolt and wing nut or other suitable fastening means.

Referring now to FIG. 3, the slide and filter retention mechanism, outer plate 28, inner plate 35 and the alignment of the apertures 29, 31 and 36 can be seen. The depth of recesses 32 is equal to that of the mounting frame material of the slide 27 such that it is held firmly between the center plate 30 and the outer plate 28. The depth of recesses 33 is such that a number of filters 34 sufficient to provide the maximum anticipated correction to an individual image may be accommodated within them.

Referring again to FIG. 1, the image integrating camera 10 also includes a lens assembly 14. The lens assembly 14 comprises a generally vertically disposed lens mounting board 40 which is mounted in a movable carriage 41. The carriage 41 supports the lens mounting board 40 and is mounted on several rollers 42 which facilitate its horizontal translation and adjustment along track 18. The carriage 41 further includes a locking device 43 such as a threaded set screw which is utilized to inhibit horizontal translation of the lens assembly 14 relative to the track 18 after the assembly 14 has been optimumly positioned. Alternately, the locking device 43 may take the form of a gear pinion which mates with a horizontal toothed gear rack affixed to track 18. A rack and pinion assembly used as an adjusting and locking mechanism is widely known in the art and will not be further discussed. The lens mounting board 40 including grouping of four lines 44, 45, 46 and 47 adjustably mounted thereon. The mounting assemblies for lenses 44, 45, 46 and 47 permit the precise vertical and horizontal adjustment of the lens relative to the mounting board 40 while maintaining the lens perpendicular thereto. The lenses 44, 45, 46 and 47 must at least be of the same focal length. The more uniform the characteristics of the four lenses utilized, the more relatively uniform will be the quality of the images produced and it is desirable, although not necessary, to utilize lenses having highly similar characteristics such as those produced by a single manufacturer.

A flexible bellows 50 interconnects the multiple lens assembly 14, specifically the mounting board 40, and the camera back 16. The camera back 16 is of conventional design and for stability may be mounted in a permanent vertical support or wall 51 according to common practice. The camera back 16 comprises an open frame 52 which is vertically disposed in the wall 51. The bellows 50 is attached to the side of the frame 52 facing the lens assembly 14. On the opposite side of frame 52 are two hinged assemblies which may be alternately positioned over the back of open frame 52. The first assembly is a plate of ground glass 53 which is pivoted on hinges 54 in order to facilitate its positioning over the back of frame 52. This ground glass plate 53 functions as a viewing screen and allows the operator to properly adjust and focus the images from the camera lenses 44-47 prior to exposing the film. The use of ground glass plates is well known in the copy camera art and will not be further discussed. If the ground glass plate 53 is pivoted away from the opening in frame 52, the film plate assembly 55 which is pivoted at hinges 56 may be moved into position at the back of open frame 52. The film plate assembly 55 is also conventional and well known in the art. The film plate assembly 55 has a vacuum board 57 upon which a sheet of film is placed prior to exposure. The vacuum board 57 is so positioned that the vertical plane it describes when in position on the camera frame 52 coincides with the vertical plane described by the ground surface of the ground glass plate 53 so that an image properly focused on the ground glass plate 53 is recorded in proper focus on the photo-sensitized material of the vacuum board 57. The vacuum board 57 includes a plurality of small openings 58 leading to a common chamber 59 which is maintained at a pressure below atmospheric by a vacuum pump (not shown). The partial vacuum achieved in chamber 59 tightly and flatly retains a sheet of film 60 against the plate surface 57. The vacuum retention of film on a plate such as plate surface 57 is well known in the art and will not be further discussed.

Referring now to FIG. 5, a spatial representation of the image integrating system is disclosed. The slide frame 25 is illustrated holding sixteen slides. For reasons of clarity this number has been chosen. In practice, the slide frame may accommodate several times this number of slides and the maximum number is limited only by such considerations as size of the frame and handling convenience.

The four lenses 44, 45, 46 and 47 are retained on mounting board 40 which is positioned between the slide frame 25 and the ground glass plate 53.

Figure 7:
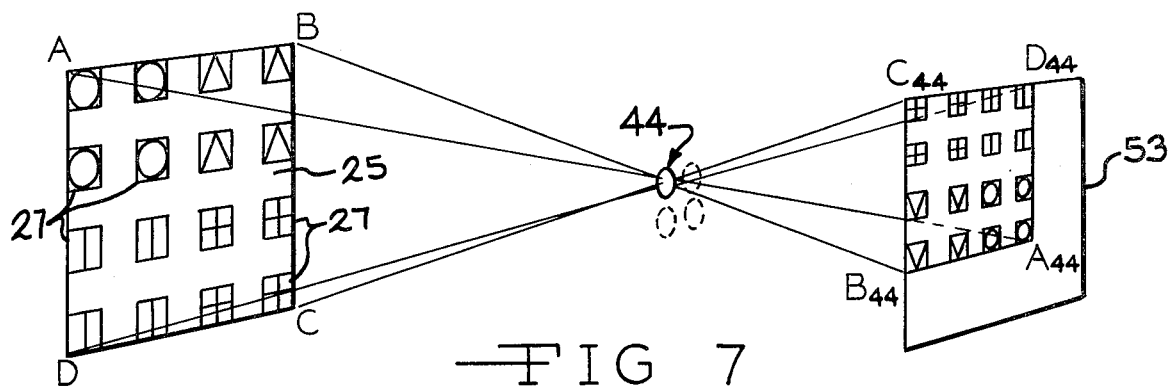
FIG. 7 is a spatial perspective view of the multiple image integrating camera illustrating the individual image generated by a first lens.

Referring particularly to FIG. 7, the image produced by the first lens, 44, is independently illustrated. Lens 44 inverts and projects the total image of frame 25 and the slides 27 contained therein in the generally upper left portion of the ground glass plate 53. The inversion of the total image places the upper left quadrant of the frame 25 in the lower right corner of the image on ground glass plate 53, which quadrant is generally centrally positioned upon the plate 53.

Figure 8:
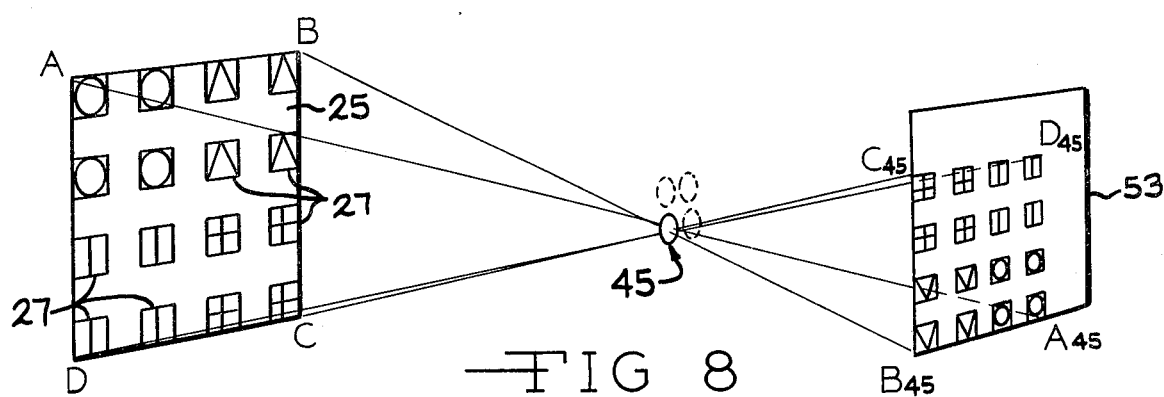
FIG. 8 is a spatial perspective view of the multiple image integrating camera illustrating the individual image produced by a second lens.

Referring now to FIG. 8, the total image produced by the second lens, 45, is independently illustrated. Lens 45 inverts and projects the total image of frame 25 and the slides 27 contained therein in the generally lower left portion of the ground glass plate 53. The inversion of the image places the lower left quadrant of the frame 25 in the upper right corner of the image on ground glass plate 53, which quadrant is generally centrally positioned upon the plate 53.

Figure 9:
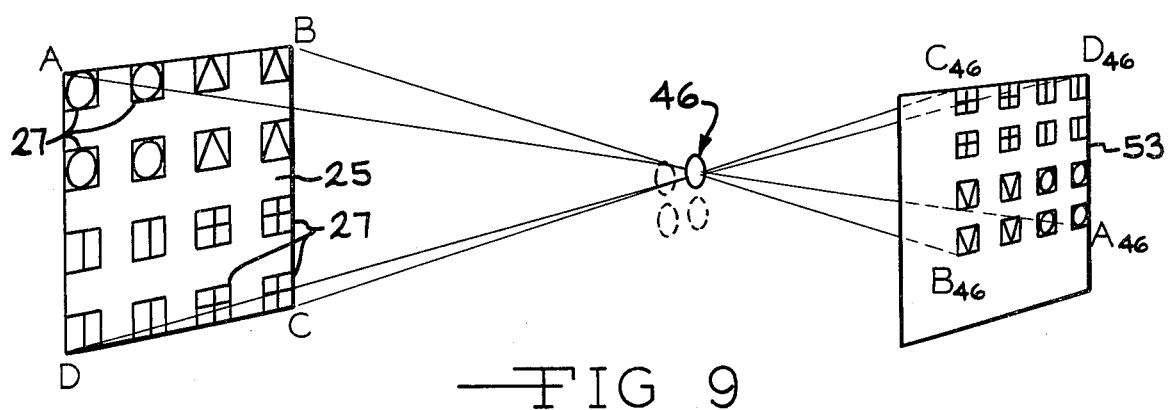
FIG. 9 is a spatial perspective view of the multiple image integrating camera illustrating the individual image produced by a third lens.

Referring now to FIG. 9, the total image produced by the third lens, 46, is independently illustrated. Lens 46 inverts and projects the total image of frame 25 and the slides 27 contained therein in the generally upper right portion of the ground glass plate 53. The inversion of the image places the upper right quadrant of the frame 25 in the lower left corner of the image on ground glass plate 53, which quadrant is generally centrally positioned upon the plate 53.

Figure 10:
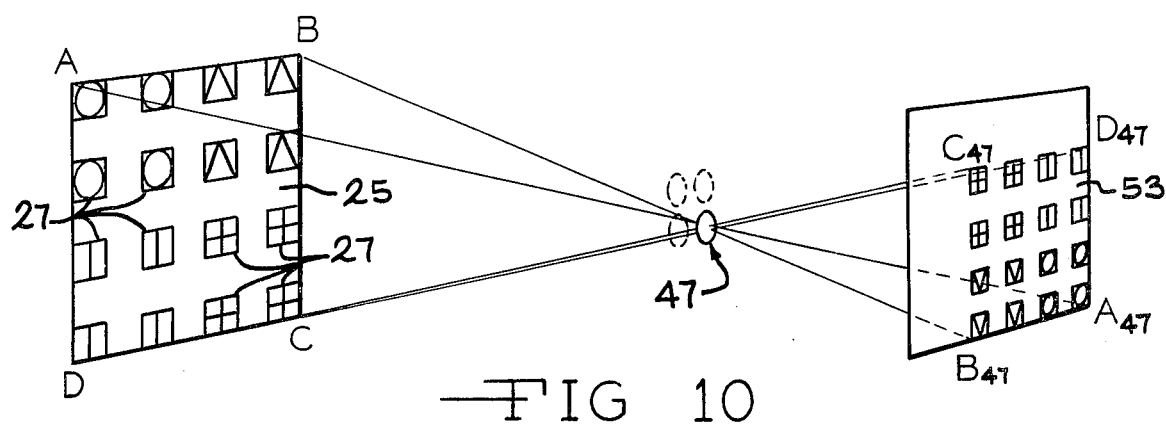
FIG. 10 is a spatial perspective view of the multiple image integrating camera illustrating the individual image produced by a fourth lens.

Finally, referring to FIG. 10, the total image produced by the fourth lens, 47, is independently illustrated. Lens 47 inverts and projects the total image of frame 25 and the slides 27 contained therein in the generally lower right portion of the ground glass plate 53. The inversion of the image places the lower right quadrant of the frame 25 in the upper left corner of the image on ground glass plate 53 which quadrant is generally centrally positioned upon the plate 53.

Referring now to FIG. 5, the integrating of the images of the four lenses 44, 45, 46 and 47 is illustrated. The four lenses independently produce four total images of the frame 25 upon the ground glass plate 53 of the camera back assembly 16. The lens 44 produces its independent image of slide frame 25 in the upper left two-thirds of the ground glass plate 53, as is illustrated in FIG. 7. The lens 45 produces its independent image in the lower left two-thirds of the ground glass plate 53, as is illustrated in FIG. 8. Lens 46 produces its independent image in the upper left two-thirds of the ground glass plate 53, as is illustrated in FIG. 9 and lens 47 produces its independent image of the slide frame 25 in the lower right two-thirds of the ground glass plate 53, as is illustrated in FIG. 10.

Referring now to FIG. 6, the high density integrated target image illustrated therein and delineated by the letters S and T represents the centermost portion of the image produced upon the ground glass plate 53. By reference again to FIGS. 7, 8, 9 and 10 and also FIG. 5, it is apparent that the image area illustrated in FIG. 6 is the result of the four independent overlapping images generated by lenses 44, 45, 46 and 47. More specifically, it is the upper left quadrant of slide frame 25 inverted and projected by lens 44, as is illustrated by FIG. 7, the lower left quadrant of slide frame 25 inverted and projected by lens 45, as is illustrated in FIG. 8, the upper right quadrant of slide frame 25 inverted and projected by lens 46, as is illustrated in FIG. 9, and the lower right quadrant of slide frame 25 inverted and projected by lens 47, as is illustrated in FIG. 10.

The grid delineated by the letters S and T in FIGS. 5 and 6 represents a complete integrated image of the slides 27 or other material and as such is the target area projected by the four lenses which is recorded onto the film 60. The images external to the S-T grid illustrated in FIG. 5 are spurious. Examination of the separate images from the individual slides on ground glass plate 53 shown in FIG. 5 reveals that the central S-T grid has the highest information density, or ratio of image area to total area. Comparison of FIG. 6 and the slide frame 25 of FIG. 5 further illustrates the greatly increased information density of the integrated image as compared to the original slides or images.

FIG. 4 illustrates the inter-image spacing of the slide frame 25. It will be appreciated that the size of the areas between the original material to be copied relative to the size of this material is critical. The image integrating system places the image of a given slide or material on the film in an area between the images of two other slides or material. Therefore, it is necessary to space the original slides or material contained in the slide frame 25 at distances sufficiently far apart to allow the images of other material to be inserted or integrated into the unused interstitial areas between the images of the first material. The preceding rule can be greatly simplified when the images are all of a uniform size, such as is the case with slides.

The image of a 35 millimeter slide is generally rectangular and it originally may have been exposed with the longer dimension oriented either horizontally or vertically. Since it is desirable to have the vertical axes of the original material uniformly aligned in the final copy, some slides must be oriented with their longer image dimension horizontally and others must be oriented vertically. Furthermore, since the image of one slide will be inserted or integrated into the interstitial area between the images of two other slides, an area sufficient to allow this integration must exist between the original material in the frame 25. Thus, it is necessary that the distance A between adjacent slides 27 or original material in the slide frame 25 be sufficient to accommodate the interstitial insertion in the final copy of either a horizontally or vertically oriented slide image. The individual inter-image spacing problem is resolved by considering the image of the slide to be a square and maintaining a distance somewhat greater than a slide of that square between adjacent slide images in the frame 25.

The slides to be duplicated are placed in the recesses 32 of the inner plate 30 of the slide frame 25. Should color correction of slides be deemed necessary, appropriate filters 34 may be inserted into recess 33 on the opposite face of inner plate 30. The outer plate 28 and the inner plate 35 of the slide frame 25 are then placed adjacent to and aligned with center plate 30 and the clamp assemblies 37 are tightened to positively retain the three plates together to form the slide frame 25. The slide frame 25 is then fitted to the housing 20 by means of retaining clips 26.

The ground glass plate 53 is lowered into position to cover the back of the camera assembly 16 and more particularly, the opening in frame 52. Power is applied to the light source 23. The position of image and light assembly 12 and lens assembly 14 is then adjusted horizontally along track 18 to achieve the desired ratio of original image size to final image size as well as to focus the image upon the ground glass plate 53. Trial and error positioning of the assemblies 12 and 14 along the track 18 will produce an image of the desired size and in proper focus upon the ground glass plate 53. The locking devices 22 and 43 are then tightened to maintain the positions of assemblies 12 and 14, respectively.

The next step of adjustment entails positioning the lenses 44, 45, 46 and 47 such that their images are positioned upon the ground glass plate 53 in accordance with the illustrations of FIGS. 7, 8, 9 and 10. The spacing between the lenses is determined by the several variables controlled by the ultimate desired reproduction ratio and desired over-all size of the copy medium.

First, the reproduction ratio of the images is selected. Based on this ratio, an appropriate lens focal length is selected. (The focal-length of reproduction ratio relationship is calculable through well known mathematical expressions). Once the appropriate focal length is selected each lens is positioned on the lens board 40 so that a selected quadrant of the projected image of the jig 25 falls on the target area "S-T" of the film plane of the camera. Each lens is off-set an exact distance from the axial center of the jig 25 whereby the overlapping projected quadrants present a separate one-quarter image of the jig to the target area S-T. Due to the spacing of the camera originals in the jig 25 as described above, each individual image of each camera original (in each overlapping quadrant) is presented to the target area "S-T" as illustrated in FIGS. 5 and 6. It can be seen, especially through a comparison of the jig 25 of FIG. 5 with the target area image shown in FIG. 6, that the individual target area images of the camera-originals are integrated within the area "S-T" and cover nearly the entire useable space within the area.

It can be appreciated that once the photo-sensitized copy material, the size of the target area S-T, has been exposed and processed, the resultant product is a reproduction of the separate camera originals to a desired reduction ratio, all located on a single copy medium.

The ground glass plate 53 is then pivoted away from the rear opening in frame 52. A sheet of unexposed photo-sensitize material, for example, color reversal transparency copy film, color reversal printing paper, or continuous-tone micro-fiche material having an area sufficiently large to record the target image grid designated by the letters S-T in FIG. 5 is then appropriately positioned on the vacuum board in the target area S-T of the film plate 57. The film plate assembly 55 is then pivoted into position and the photo-senstive material exposed by the integrated image projected by the four lenses.

While repeated reference has been made to the duplication of slides, it is again emphasized that the duplication technique herein described may be utilized to duplicate, reduce in size and increase in density any medium capable of photographic reproduction. To this end, in the previous operational description concerning the duplication of slides, it should be remembered that with only minor modifications, the description applies to any media which may be photographed.

Various other embodiments and alterations to this preferred embodiment will be apparent to those skilled in the art and may be made without departing from the spirit and scope of the following claims.

What is claimed is:

1. A method of reproducing separate and non-related graphic originals as a group of high information density images of a selected reproduction ratio comprising the steps of:
    (a) Placing the originals into a frame having means for retaining the originals in a first widely spaced relationship and a first arrangement defining a first group;
    (b) Locating said frame before a plurality of lens units for projecting separate images of said first group from each lens unit onto a single focal plane; and
    (c) Adjusting each lens unit to project an image of a selected and discrete segment of said first group into a central target area on said focal plane, whereby a cumulative image from all of said lens units in said target area comprises separate images of the originals in a second more closely spaced relationship and a second arrangement as a second group distinct from said first group.

2. A method of reproducing separate and non-related graphic originals as a group of images of a selected reproduction ratio onto a single photo sensitive copy medium, each of the originals defining a reference square circumscribed thereabout, comprising the steps of:
   (a) Placing the originals in a frame having means for retaining the originals in a first spaced relationship and a first arrangement defining a first group, said first spaced relationship having such reference squares spaced apart by at least the length of a side of the largest of such reference squares;
   (b) Locating said frame before a plurality of lens units for projecting separate images of said first group from each lens unit onto a single focal plane;
   (c) Adjusting each lens to project an image of a selected and discrete segment of said first group into a central target area on said focal plane whereby a cumulative image from said lens unit in said target area comprises separate images of the originals in a second spaced relationship and a second arrangement as a second group distinct from said first group and first arrangement;
   (d) Selecting a photo-sensitive copy medium having the same dimension as the target area; and
   (e) Projecting and fixing said cumulative image on the photo-sensitive material.

3. The method of claim 2 including the additional step of placing color and density correction filters in said frame adjacent the separate originals of said first group to form color and density - corrected separate images in said second group.

4. The method of claim 2 wherein said selection of said photo-sensitive material includes the selection of a color-sensitive material.

5. An apparatus for reproducing separate and non-related graphic originals as a group of high information density images of a selected reproduction ratio comprising a frame having means for retaining the originals in a first widely spaced relationship and in a first arrangement as a first group, a lens support, and a focal plane defining a central traget area on said plane, means for locating said lens support between said frame and said focal plane, and a plurality of lens units positioned on said lens support whereby each of said lens units projects a selected and discrete segment image of said first group on said central target area and whereby a cumulative image from all of said lens units in said target area comprises separate images of the originals in a second more closely spaced relationahip and a second arrangement as a second group distinct from said first group.

6. An apparatus according to claim 5 wherein said retaining means comprises a first planar sheet having first spaced-apart openings for receiving an original in each of the openings; a second planar sheet having second spaced apart openings located in complementary relationship with said first openings and means for closing said second sheet on said first sheet for retaining the originals in locking engagement and alignment with said first and second openings.

7. Apparatus according to claim 6 wherein said openings are spaced apart a distance at least equal to the longest aspect of the original retained in said opening.

8. Apparatus according to claim 5 wherein the focal plane comprises a ground glass, said target area being inscribed on said glass, and means for positioning said ground glass juxtaposed said lens support for viewing said cumulative image in said target area.

9. Apparatus according to claim 5 further comprising means for retaining color and density filters on said frame adjacent selected originals retained therein for selectively adjusting color balance and density of said projected originals.

10. Apparatus according to claim 5 wherein said plurality of lenses comprises four separate lens units.

11. Apparatus according to claim 5 further comprising means for illuminating said frame retaining the originals.

12. An apparatus for reproducing separate and non-related graphic originals as a group of images of a selected reproduction ratio comprising a frame having means for retaining the originals in a first spaced relationship and in a first arrangement as a first group, each of the originals defining a reference square circumscribed thereabout and positioned in said first spaced relationship with such reference squares spaced apart by at least the length of a side of the largest of said reference squares, a lens support, and a focal plane defining a target area on said plane, means for locating said lens support between said frame and said focal plane, and a plurality of lens units positioned on said lens support whereby each of said lens units projects a selected and discrete segment image of said first group on said target area and whereby a cumulative image from all of the said lens units in said target area comprises separate images of the originals in a second group distinct from said first group.

13. The apparatus of claim 12, wherein said plurality of lens units comprises four lens units.

* * * * *